(12) United States Patent
Hwang et al.

(10) Patent No.: US 8,608,237 B2
(45) Date of Patent: Dec. 17, 2013

(54) CENTER FLOOR PANEL ASSEMBLY FOR VEHICLE

(75) Inventors: Dae Gil Hwang, Suwon-si (KR); Cheol Ung Kim, Seoul (KR); Won Sik Kim, Suwon-si (KR); Chang Wook Park, Suwon-si (KR); Jae Hwa Kim, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 75 days.

(21) Appl. No.: 13/308,244

(22) Filed: Nov. 30, 2011

(65) Prior Publication Data

US 2013/0038090 A1 Feb. 14, 2013

(30) Foreign Application Priority Data

Aug. 11, 2011 (KR) .................. 10-2011-0080271

(51) Int. Cl.
*B60J 7/00* (2006.01)

(52) U.S. Cl.
USPC .................................................... 296/193.07

(58) Field of Classification Search
USPC ............... 296/193.07, 203.01, 204, 205, 209; 180/190, 291, 309, 376, 380, 89.2
See application file for complete search history.

(56) References Cited

U.S. PATENT DOCUMENTS

| | | | | |
|---|---|---|---|---|
| 2,081,546 A * | 5/1937 | MacPherson | .................. | 180/296 |
| 3,149,856 A * | 9/1964 | Schilberg | ..................... | 180/89.2 |
| 3,177,031 A * | 4/1965 | Schilberg | ..................... | 296/204 |
| 3,423,122 A * | 1/1969 | Wessells | .................. | 296/203.01 |
| 4,081,197 A * | 3/1978 | Ackel | ........................... | 296/204 |
| 4,440,434 A * | 4/1984 | Celli | ........................... | 296/181.2 |
| 4,514,008 A * | 4/1985 | Watanabe et al. | .............. | 296/204 |
| 5,196,253 A * | 3/1993 | Mueller et al. | ................ | 428/138 |
| 5,219,439 A * | 6/1993 | Moore et al. | ................. | 296/35.1 |
| 5,323,989 A * | 6/1994 | Hamada et al. | ................. | 248/60 |
| 5,464,952 A * | 11/1995 | Shah et al. | ................... | 181/211 |
| 5,550,338 A * | 8/1996 | Hielscher | ..................... | 181/290 |
| 5,813,491 A * | 9/1998 | Sato et al. | ..................... | 180/309 |
| 5,817,991 A * | 10/1998 | Suyama et al. | ............... | 181/243 |
| 5,996,730 A * | 12/1999 | Pirchl | ........................... | 181/211 |
| 6,173,800 B1 * | 1/2001 | Steenackers et al. | ........ | 180/89.2 |
| 6,193,306 B1 * | 2/2001 | Lee | ................................. | 296/209 |
| 6,298,935 B1 * | 10/2001 | Steenackers et al. | ........ | 180/89.2 |
| 6,302,466 B1 * | 10/2001 | Zwick | ........................... | 296/39.3 |
| 6,382,710 B1 * | 5/2002 | Funk et al. | ................. | 296/187.12 |
| 6,438,949 B1 * | 8/2002 | Nozaki | ............................ | 60/322 |
| 6,536,548 B2 * | 3/2003 | Steenackers et al. | ........ | 180/89.2 |

(Continued)

FOREIGN PATENT DOCUMENTS

| | | |
|---|---|---|
| JP | 2010-234994 | 10/2010 |
| KR | 1020010034353 A | 4/2001 |
| KR | 1020020000923 A | 1/2002 |
| KR | 1020080025250 A | 3/2008 |

*Primary Examiner* — Kiran B Patel
(74) *Attorney, Agent, or Firm* — Morgan, Lewis & Bockius LLP

(57) ABSTRACT

A center floor panel assembly for a vehicle may include a first center floor panel and a second center floor panel mutually engaged to form a tunnel portion of a closed section in which a center muffler unit that may be provided in a vertical direction of a vehicle body may be accommodated, and provided in a continuous shape along a longitudinal direction of the vehicle body, and a support member provided in the tunnel portion between the first center floor panel and the second center floor panel and enclosing the center muffler unit to support the center muffler unit against the tunnel portion.

10 Claims, 7 Drawing Sheets

(56) References Cited

U.S. PATENT DOCUMENTS

| | | | |
|---|---|---|---|
| 6,688,677 B2 * | 2/2004 | Glashagel et al. | 296/203.01 |
| 6,908,145 B2 * | 6/2005 | Joaquin et al. | 296/193.07 |
| 6,997,662 B2 * | 2/2006 | Nishikawa | 411/437 |
| 7,025,412 B2 * | 4/2006 | Nakamura et al. | 296/193.07 |
| 7,140,642 B2 * | 11/2006 | Ito et al. | 280/834 |
| 7,182,382 B2 * | 2/2007 | Harima et al. | 296/37.2 |
| 7,357,062 B2 * | 4/2008 | Joynt | 89/36.08 |
| 7,367,417 B2 * | 5/2008 | Inui et al. | 180/89.2 |
| 7,434,656 B2 * | 10/2008 | Yasuda et al. | 181/227 |
| 7,445,084 B2 * | 11/2008 | Berbner et al. | 181/290 |
| 7,600,807 B2 * | 10/2009 | Bachmann | 296/187.08 |
| 7,658,440 B2 * | 2/2010 | Tohda et al. | 296/204 |
| 7,717,206 B2 * | 5/2010 | Tanaka et al. | 180/68.3 |
| 7,735,903 B2 * | 6/2010 | Yamamura et al. | 296/187.12 |
| 7,798,564 B2 * | 9/2010 | Doi et al. | 296/193.07 |
| 7,810,875 B2 * | 10/2010 | Gerisch | 296/193.07 |
| 7,836,999 B2 * | 11/2010 | Kato | 180/312 |
| 7,874,606 B2 * | 1/2011 | Yamamura et al. | 296/64 |
| 7,878,286 B2 * | 2/2011 | Kobayashi et al. | 180/309 |
| 7,900,998 B2 * | 3/2011 | Onoda et al. | 296/208 |
| 8,016,070 B2 * | 9/2011 | Naito et al. | 180/380 |
| 8,052,205 B2 * | 11/2011 | Matsuyama | 296/193.07 |
| 8,074,762 B2 * | 12/2011 | Mabuchi et al. | 180/309 |
| 8,151,922 B2 * | 4/2012 | Suzuki | 180/89.2 |
| 8,191,670 B2 * | 6/2012 | Garcia Garcia et al. | 180/309 |
| 8,393,669 B2 * | 3/2013 | Ajisaka | 296/187.09 |
| 2001/0026083 A1 * | 10/2001 | Averdiek et al. | 296/204 |
| 2002/0185893 A1 * | 12/2002 | Hashirayama et al. | 296/204 |
| 2004/0069562 A1 * | 4/2004 | Kondo et al. | 181/227 |
| 2006/0163914 A1 * | 7/2006 | Kamura et al. | 296/193.07 |
| 2007/0007060 A1 * | 1/2007 | Ono et al. | 180/65.3 |
| 2007/0007797 A1 * | 1/2007 | Seki | 296/208 |
| 2007/0045034 A1 * | 3/2007 | Kim | 180/379 |
| 2008/0315629 A1 * | 12/2008 | Abe et al. | 296/204 |
| 2010/0187864 A1 * | 7/2010 | Tsuchida | 296/193.07 |
| 2013/0038090 A1 * | 2/2013 | Hwang et al. | 296/193.07 |

* cited by examiner

CENTER FLOOR PANEL ASSEMBLY FOR VEHICLE

CROSS-REFERENCE TO RELATED APPLICATION

The present application claims priority to Korean Patent Application No. 10-2011-0080271, filed on Aug. 11, 2011 in the Korean Intellectual Property Office, the entire contents of which is incorporated herein for all purposes by this reference.

BACKGROUND OF THE INVENTION

1. Field of the Invention

The present invention relates to a center floor panel assembly for a vehicle, and more particularly, to a center floor panel assembly for a vehicle, which can integrally assemble a center muffler unit.

2. Description of the Prior Art

In a vehicle in the related art, as illustrated in FIG. 1, a muffler unit 60 is arranged on a bottom portion of a floor panel 10 in a vertical direction.

The muffler unit 60, as illustrated in FIGS. 2 and 3, is positioned in a lower portion of a tunnel portion 15 that is formed on a plate surface of the floor panel 10 in the vertical direction, and is connected to the floor panel 10 through a muffler hanger 20 and hanger bars 30 and 40.

The muffler hanger 20 is made of a rubber material having elasticity to absorb vibration and noise of a vehicle exhaust system, and serves to connect the muffler unit 60 to the floor panel 10 together with the hanger bars 30 and 40.

A muffler bar includes the muffler side hanger bar 30 having one end that is fixed to the muffler unit 60 and the other end that is connected to the muffler hanger 20, and the vehicle body side hanger bar 40 having one end that is fixed to the floor panel 10 and the other end that is connected to the muffler hanger 20.

In the vehicle in the related art, however, the muffler unit 60 is not integrally constructed with the floor panel 10, but is spaced apart from the floor panel 10 for a predetermined height, and thus it cannot contribute to the vehicle body stiffness.

Further, in order to prevent the heat injury caused by the muffler unit 60 through which high-temperature exhaust gas passes, it is required to form the tunnel portion 15 with a great height. Accordingly, it is disadvantageous in securing the indoor space and the layout is restricted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a center floor panel assembly for a vehicle, which can integrally assemble a muffler unit and a tunnel portion and thus can improve vehicle body stiffness and providing a center floor panel assembly for a vehicle, which can secure an indoor space through reduction of the height of a tunnel portion and thus can improve the degree of freedom of the layout.

In an aspect of the present invention, a center floor panel assembly for a vehicle may include a first center floor panel and a second center floor panel mutually engaged to form a tunnel portion of a closed section in which a center muffler unit that is provided in a vertical direction of a vehicle body is accommodated, and provided in a continuous shape along a longitudinal direction of the vehicle body, and a support member provided in the tunnel portion between the first center floor panel and the second center floor panel and enclosing the center muffler unit to support the center muffler unit against the tunnel portion.

The support member supports the center muffler unit between the first center floor panel and the second center floor panel so that the center muffler unit is positioned on a center lower side of the tunnel portion.

The support member supports the center muffler unit between the first center floor panel and the second center floor panel so that a plurality of airflow paths is formed around the center muffler unit.

The tunnel portion may include a first tunnel portion formed to project upward from a plate surface of the first center floor panel and positioned to be spaced apart from an upper portion of the center muffler unit, and a second tunnel portion formed to project downward from a plate surface of the second center floor panel and positioned on a lower portion of the center muffler unit, the second tunnel portion being engaged with an outer circumference of the center muffler unit.

The first center floor panel may include a horizontal portion extended for a predetermined width in a traverse direction of the vehicle body, the first tunnel portion formed to project upwards in the longitudinal direction of the vehicle body from a plate surface of the horizontal portion, and a reinforcement portion formed to project downwards along the longitudinal direction from the plate surface of the horizontal portion to reinforce stiffness wherein the reinforcement portion is formed on both lateral sides of the first tunnel portion.

The second center floor panel may include the second tunnel portion formed to project downwards along the longitudinal direction of the vehicle body, and a second tunnel flange extended from both lateral ends of the second tunnel portion and engaged with the first center floor panel in the neighborhood of the first tunnel portion.

The support member is engaged with an inner surface of the tunnel portion and the outer circumference of the center muffler unit and forms the plurality of air flow paths therebetween.

The support member may include a support panel surrounding and being engaged to outer circumferences of both sides of the center muffler unit, a support flange extended from lower ends of both sides of the support panel to outside and engaged with an inner surface of the second tunnel portion, and a rib projecting upward from upper ends of the both sides of the support panel and engaged with an inner surface of the first tunnel portion.

The plurality of air flow paths may include two first air flow paths formed between the inner surfaces of the first tunnel portion and the second tunnel portion and outer surface of the support panel, and one second air flow path formed between the outer circumference of the center muffler unit and the inner circumference of the rib.

The support member is a panel having a continuous shape along the longitudinal direction of the vehicle body.

The center floor panel assembly may further include a reinforcement portion provided on outside of the tunnel portion and connecting a front sheet cross member to the tunnel portion with a predetermined space to reinforce stiffness.

The center muffler unit may include an inner pipe in which a flow path through which exhaust gas passes is formed, a heat insulating material surrounding the inner pipe to intercept heat transfer of the exhaust gas that flows through the flow path, and an outer pipe surrounding the heat insulating material and supported in the tunnel portion.

Plural holes are penetratingly formed on the inner pipe.

As described above, according to the center floor panel assembly for a vehicle according to the exemplary embodiments of the present invention, since the center muffler unit is integrated with the tunnel portion that forms the closed section, the center muffler unit itself can contribute to the stiffness of the vehicle body, and thus the stiffness of the vehicle body can be improved.

Further, according to the exemplary embodiments of the invention, since the air flow path is secured in the tunnel portion of the closed section and the heat insulating material is provided in the center muffler unit, the height of the tunnel portion can be reduced, unlike the structure in the related art in which the tunnel portion with a great height is provided to prevent the heat injury, and thus the indoor space can be secured and the degree of freedom of the layout can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
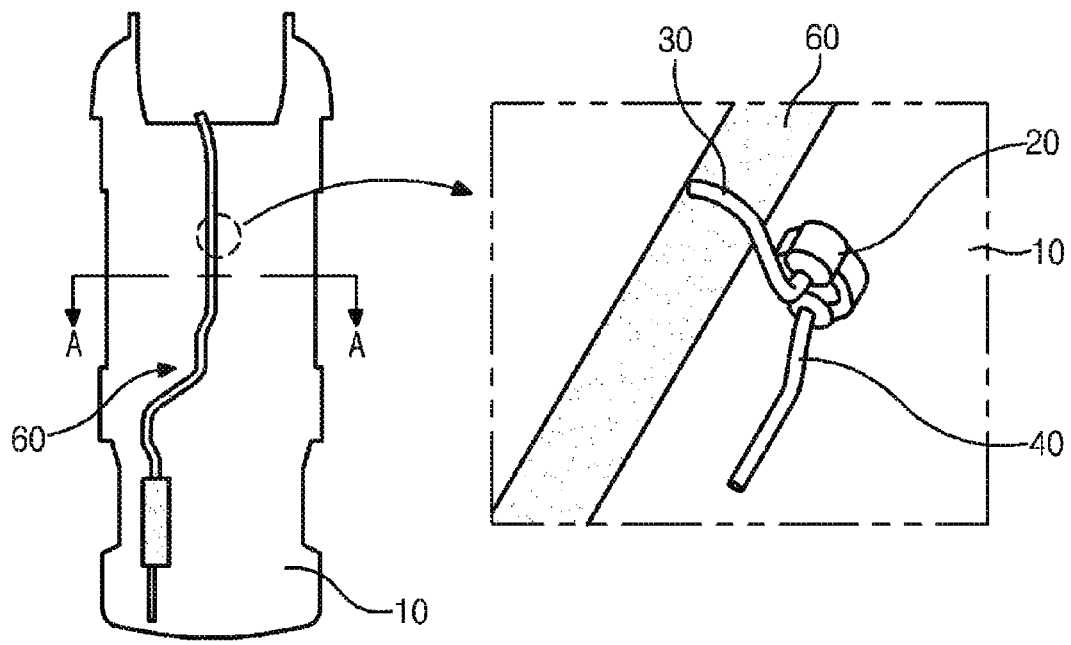
FIG. 1 is a view schematically illustrating a state where a muffler unit is arranged on a bottom portion of a floor panel in a vehicle in the related art.
Figure 2:
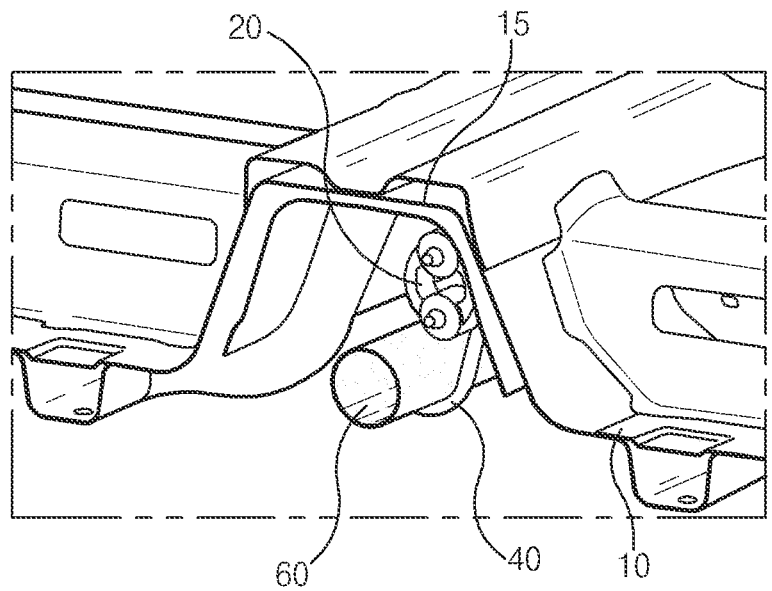
FIG. 2 is a perspective view illustrating a state where a muffler floor panel of FIG. 1 is connected to a floor panel.
Figure 3:
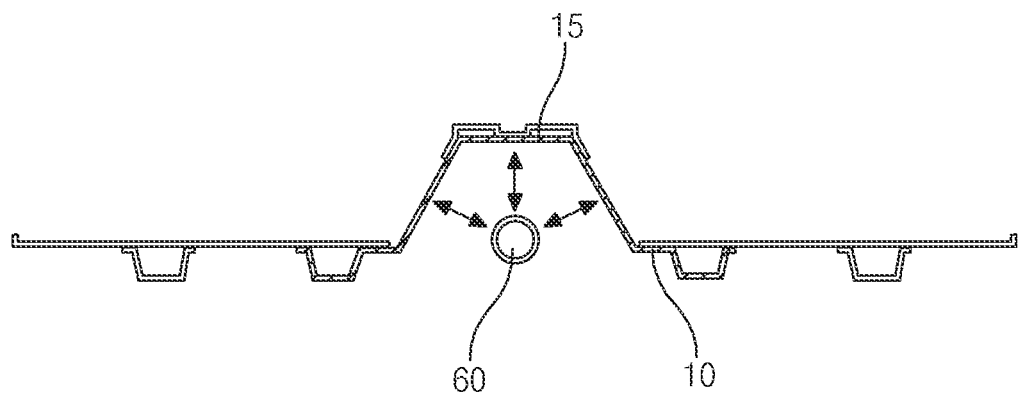
FIG. 3 is a cross-section view taken along line A-A in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, preferred embodiments of the present invention will be described with reference to the accompanying drawings. In the entire description of the present invention, the same drawing reference numerals are used for the same elements across various figures.

Figure 4:
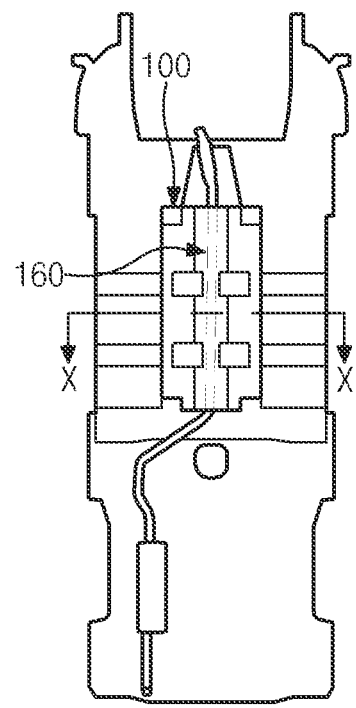
FIG. 4 is a bottom view showing a center floor panel assembly for a vehicle according to an exemplary embodiment of the present invention.
Figure 5:
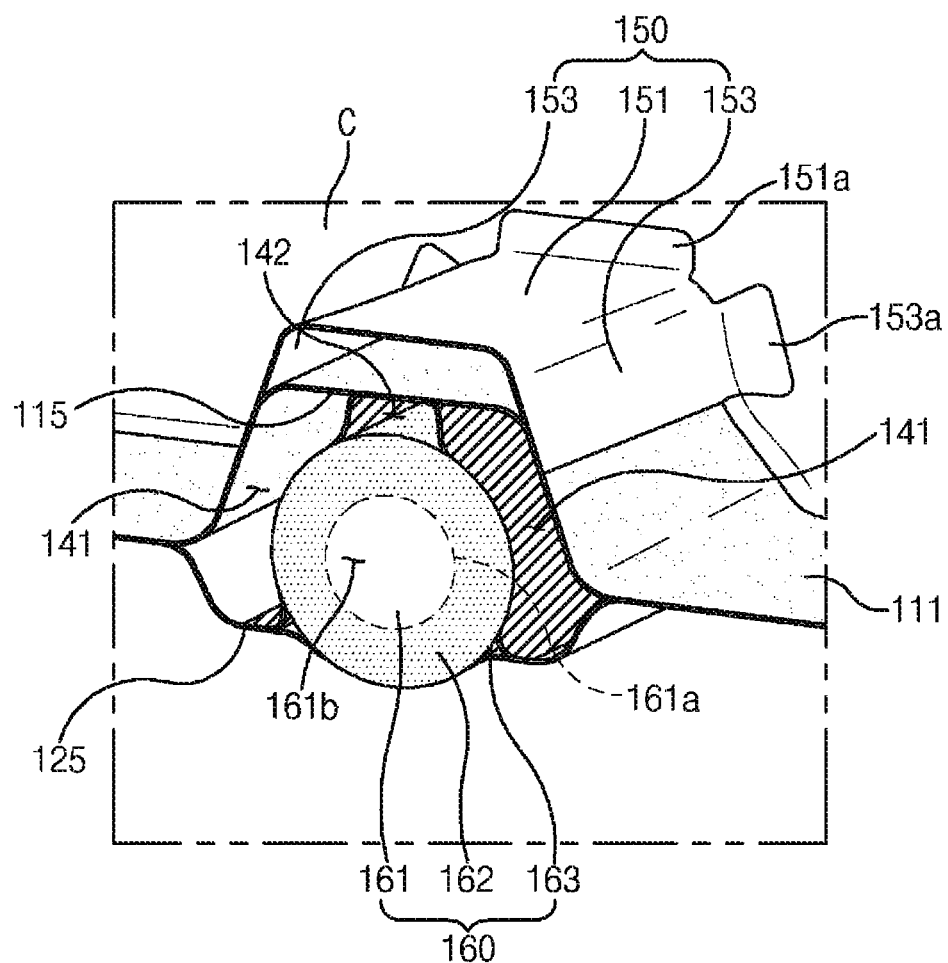
FIG. 5 is a combined perspective view illustrating a state where a center muffler unit is mounted on a center floor panel assembly of a vehicle according to an exemplary embodiment of the present invention.
Figure 6:
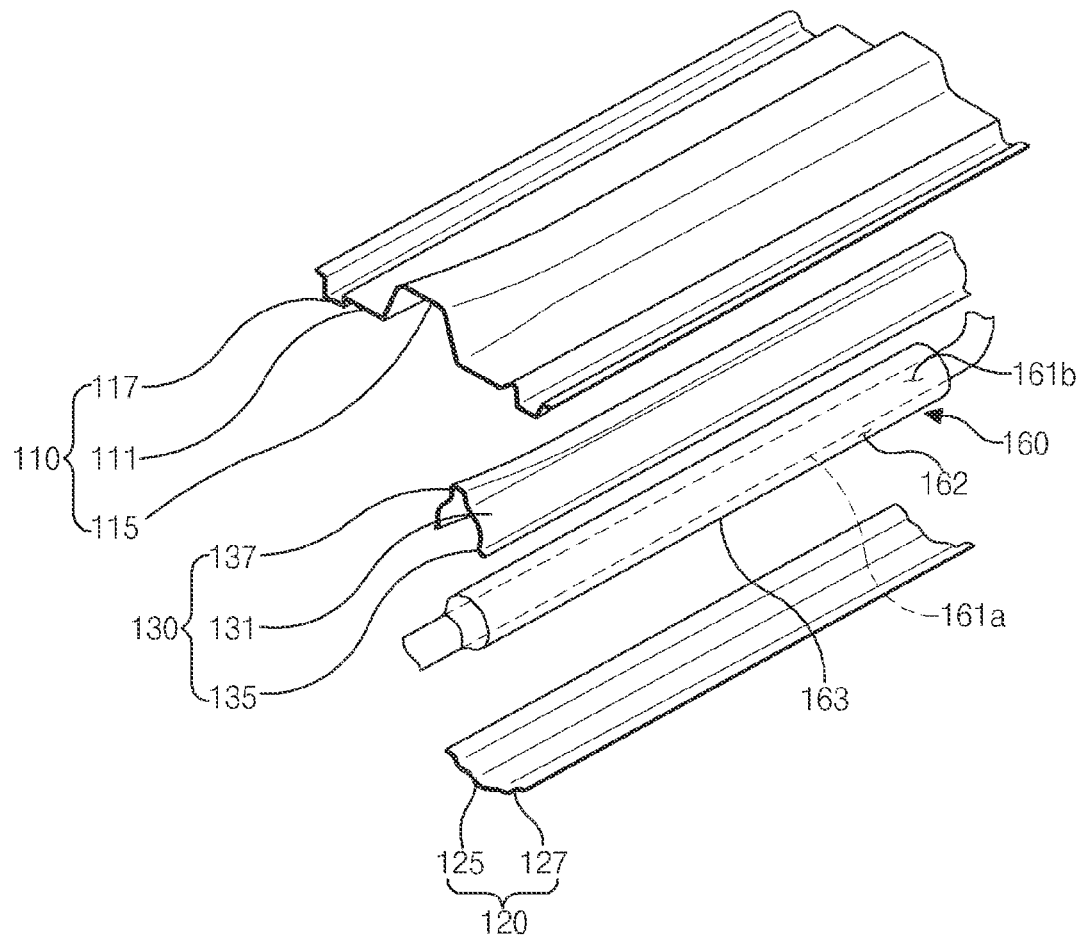
FIG. 6 is a separable perspective view illustrating a center floor panel assembly for a vehicle according to an exemplary embodiment of the present invention.
Figure 7:
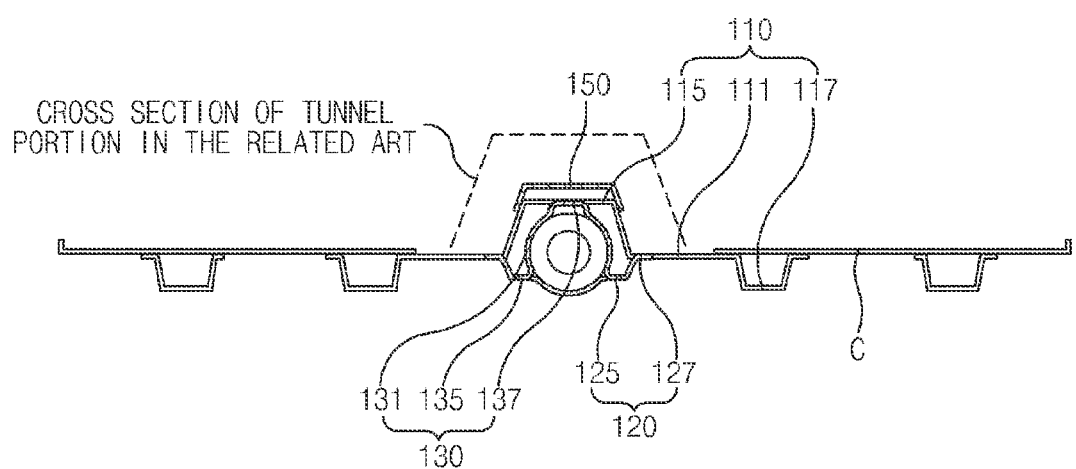
FIG. 7 is a cross-sectional view taken along line X-X in FIG. 4, for comparing heights of the tunnel portion of the floor panel in the related art the tunnel portion according to an exemplary embodiment of the present invention with each other.

FIG. 4 is a bottom view showing a center floor panel assembly for a vehicle according to an exemplary embodiment of the present invention, and FIG. 5 is a combined perspective view illustrating a state where a center muffler unit is mounted on a center floor panel assembly of a vehicle according to an exemplary embodiment of the present invention. FIG. 6 is a separable perspective view illustrating a center floor panel assembly for a vehicle according to an exemplary embodiment of the present invention, and FIG. 7 is a cross-sectional view taken along line X-X in FIG. 4, for comparing heights of the tunnel portion of the floor panel in the related art the tunnel portion according to an exemplary embodiment of the present invention with each other.

According to the center floor panel assembly 100 for a vehicle according to an exemplary embodiment of the invention, as illustrated in FIGS. 4 to 7, a center muffler unit 160 is supported in tunnel portions 115 and 125 of a closed section. Accordingly, the center muffler unit 160 contributes to the stiffness of the vehicle, and thus the stiffness of the vehicle body can be improved.

For this, the center floor panel assembly 100 for a vehicle briefly includes a first center floor panel 110 provided in a continuous shape along the longitudinal direction of the vehicle body, a second center floor panel 120, and a support member 130. Here, the term "continuous" means that the first center floor panel 110, the second center floor panel 120, and the support member 130 are not cut off in the middle, but are continuous along the longitudinal direction of the vehicle body.

The first center floor panel 110 and the second center floor panel 120 are engaged with each other through welding to form tunnel portions 115 and 125 of the closed section on which the center muffler unit 160 is supported.

More specifically, the first center floor panel 110 includes a horizontal portion 111 slightly extended in a traverse direction of the vehicle body, a first tunnel portion 115 formed on the plate surface of the horizontal portion 111 along the longitudinal direction of the vehicle body, and a reinforcement portion 117.

The first tunnel portion 115, which is one of constituent elements that form the tunnel portions 115 and 125, is formed to project upward from the plate surface of the horizontal portion 111 and is positioned on an upper portion of the center muffler unit 160. In this case, since the first tunnel portion 115 is positioned to be spaced apart from the center muffler unit 160, the high-temperature center muffler unit 160 is prevented from being in direct contact with the first tunnel portion 115 to minimize heat injury.

The reinforcement portion 117 is formed to project downward from the plate surface of the horizontal portion 111 along the longitudinal direction to reinforce the stiffness of the horizontal portion 111.

On the other hand, the second center floor panel 120 includes the second tunnel portion 125 formed along the longitudinal direction of the vehicle body and a second tunnel flange 127 extended from both ends of the second tunnel portion 125.

The second tunnel portion 125, which is one of constituent elements that form the tunnel portions 115 and 125, is formed to project downward and is positioned on a lower portion of the center muffler unit 160. In this case, the second tunnel portion 125 is welded to the outer circumference of the center muffler unit 160 and supports the center muffler unit 160.

The second tunnel flange 127 is extended from both ends of the second tunnel portion 125, and is welded to the first center floor panel 110 in the neighborhood of the first tunnel portion 125, and thus the tunnel portions 115 and 125 that include the first tunnel portion 115 and the second tunnel portion 125 form the closed section.

That is, the tunnel portions 115 and 125 form the closed section through the mutual engagement of the first tunnel portion 115 and the second tunnel portion 125 formed on the first center floor panel 110 and the second center floor panel 120, respectively, and the center muffler unit 160 is integrated in a space between the first tunnel portion 115 and the second tunnel portion 125. Accordingly, the center muffler unit 160 contributes to the stiffness of the vehicle body, and thus the stiffness of the vehicle body can be improved.

Further, since the center muffler unit 160 can be sufficiently supported in the tunnel portions 115 and 125 of the closed section, separate muffler hanger 20 and hanger bars 30 and 40 for connecting the center muffler unit 160 to the vehicle body are not necessary, and thus the manufacturing cost is saved.

In addition, since the air flow paths 141 and 142 for making air pass through the tunnel portions 115 and 125 are formed, the high-temperature center muffler unit 160 can be sufficiently cooled. Accordingly, unlike the structure in the related art in which the tunnel portion 15 with a great height is provided to prevent the heat injury, since the tunnel portions 115 and 125 can be designed with their height reduced (see FIG. 7), the indoor space can be secured and the degree of freedom of the layout can be improved.

The support member 130, which is a panel in the continuous shape along the longitudinal direction of the vehicle body, partitions the air flow paths 141 and 142, and is engaged by welding with an inner surfaces of the tunnel portions 115 and 125 and the outer circumference of the center muffler unit 160. In this case, the support member 130 is formed in a continuous shape along the vertical direction of the vehicle body to surround the center muffler unit 160, and is welded to the inner surfaces of the first tunnel portion 115 and the second tunnel portion 125.

For this, the support member 130 includes a support panel 131 welded to surround the outer circumferences of both sides of the center muffler unit 160, a support flange 135 extended from the lower ends of both sides of the support panel 131 to outside and welded to the inner surface of the second tunnel portion 125, and a rib 137 connected to project upward from the upper ends of the both sides of the support panel 131 and welded to the inner surface of the first tunnel portion 115.

The rib 137 is a surface that is welded to the first tunnel portion 115, and serves to increase the bending stiffness in the vertical direction.

As described above, by the structure of the support member 130, the space between the first tunnel portion 115 and the second tunnel portion 125 is partitioned into three air flow paths 141 and 142.

That is, the air flow paths includes two first air flow paths 141 formed between the inner surfaces of the first tunnel portion 115 and the second tunnel portion 125 and the outer surface of the support panel 131, and one second air flow path 142 formed between the outer circumference of the center muffler unit 160 and the rib 137.

In particular, the second air flow path 142 is positioned on the upper side of the center muffler unit 160 to prevent the high-temperature center muffler unit 160 from being in direct contact with the indoor side of the vehicle.

Accordingly, the air cools the exhaust gas that passes through the center muffler unit 160 as moving along the longitudinal direction of the vehicle body through the air flow paths 141 and 142, and thus the heat injury can be maximally prevented.

On the other hand, on the outer sides of the tunnel portions 115 and 125, the reinforcement portion 150 that reinforces the stiffness through connection of the front sheet cross member to the tunnel portions 115 and 125 is engaged.

The engagement member 150 is particularly configured to connect the outer surface of the first tunnel portion 115 and the front sheet cross member C, and includes a reinforcement body 151 that is spaced apart from the first tunnel portion 115 and is positioned on the upper portion, and an extended surface 153 extended downward from the both sides of the reinforcement body 151 and welded to the side surface of the first tunnel portion 115.

In this case, on one side of the reinforcement body 151 and the extended surface, flanges 151a and 153a for being welded to the front sheet cross member C are formed.

On the other hand, the center muffler unit 160 according to an exemplary embodiment of the present invention includes an inner pipe 161, a heat insulating material 162, and an outer pipe 163. As described above, since the center muffler unit 160 has a triple structure that includes the heat insulating material 162, the heat of the exhaust gas can be maximally prevented from being transferred to the vehicle body.

A flow path 161b through which the exhaust gas passes is formed inside the inner pipe 161, and plural holes 161a are penetratingly formed along an outer circumference of the inner pipe 161 so that a part of the exhaust gas is absorbed in the heat insulating material 162. Accordingly, the exhaust gas that flows through the inside of the inner pipe 161 is absorbed into the heat insulating material 162 through plural holes 161a, and thus vibration and noise caused by the exhaust gas are absorbed to improve the NVH performance.

The heat insulating material 162 surrounds the inner pipe 161, and intercepts the heat transfer of the exhaust gas that flows through the flow path 161b to prevent the heat injury of the vehicle body. Further, the heat insulating material absorbs the vibration and noise of the inner pipe 161 due to the movement of the exhaust has.

The outer pipe 163 surrounds the heat insulating material, and is welded to the inner surface of the second tunnel portion 125.

As described above, according to an exemplary embodiment of the present invention, since the center muffler unit 160 is integrated with the tunnel portions 115 and 125 that form the closed section, the center muffler unit 160 itself can contribute to the stiffness of the vehicle body, and thus the stiffness of the vehicle body can be improved.

Further, according to an exemplary embodiment of the present invention, since the air flow paths 141 and 142 are secured in the tunnel portions 115 and 125 of the closed section and the heat insulating material 162 is provided in the center muffler unit 160, the height of the tunnel portion 15 can be reduced, unlike the structure in the related art in which the tunnel portion 15 with a great height is provided to prevent the heat injury, and thus the indoor space can be secured and the degree of freedom of the layout can be improved.

In the above-described embodiment, the reinforcement member is constructed to connect the first tunnel portion and the front sheet cross member. However, it is also possible for the reinforcement member to connect the second tunnel portion and the front sheet cross member.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center floor panel assembly for a vehicle including:
   a first center floor panel and a second center floor panel mutually engaged to form a tunnel portion of a closed section in which a center muffler unit that is provided in a vertical direction of a vehicle body is accommodated, and provided in a continuous shape along a longitudinal direction of the vehicle body; and
   a support member provided in the tunnel portion between the first center floor panel and the second center floor panel and enclosing the center muffler unit to support the center muffler unit against the tunnel portion;
   wherein the support member supports the center muffler unit between the first center floor panel and the second center floor panel so that a plurality of airflow paths are formed around the center muffler unit;
   wherein the tunnel portion includes a first tunnel portion formed to project upward from a plate surface of the first center floor panel and positioned to be spaced apart from an upper portion of the center muffler unit, and a second tunnel portion formed to project downward from a plate surface of the second center floor panel and positioned on a lower portion of the center muffler unit, the second tunnel portion being engaged with an outer circumference of the center muffler unit;
   wherein the support member is engaged with an inner surface of the tunnel portion and the outer circumference of the center muffler unit and forms the plurality of air flow paths therebetween.

2. The center floor panel assembly according to claim 1, wherein the support member supports the center muffler unit between the first center floor panel and the second center floor panel so that the center muffler unit is positioned on a center lower side of the tunnel portion.

3. The center floor panel assembly according to claim 1, wherein the first center floor panel includes:
   a horizontal portion extended for a predetermined width in a traverse direction of the vehicle body,
   the first tunnel portion formed to project upwards in the longitudinal direction of the vehicle body from a plate surface of the horizontal portion, and
   a reinforcement portion formed to project downwards along the longitudinal direction from the plate surface of the horizontal portion to reinforce stiffness wherein the reinforcement portion is formed on both lateral sides of the first tunnel portion.

4. The center floor panel assembly according to claim 1, wherein the second center floor panel includes:
   the second tunnel portion formed to project downwards along the longitudinal direction of the vehicle body, and
   a second tunnel flange extended from both lateral ends of the second tunnel portion and engaged with the first center floor panel in the neighborhood of the first tunnel portion.

5. The center floor panel assembly according to claim 1, wherein the support member includes:
   a support panel surrounding and being engaged to outer circumferences of both sides of the center muffler unit;
   a support flange extended from lower ends of both sides of the support panel to outside and engaged with an inner surface of the second tunnel portion; and
   a rib projecting upward from upper ends of the both sides of the support panel and engaged with an inner surface of the first tunnel portion.

6. The center floor panel assembly according to claim 5, wherein the plurality of air flow paths includes:
   two first air flow paths formed between the inner surfaces of the first tunnel portion and the second tunnel portion and outer surface of the support panel, and
   one second air flow path formed between the outer circumference of the center muffler unit and the inner circumference of the rib.

7. The center floor panel assembly according to claim 1, wherein the support member is a panel having a continuous shape along the longitudinal direction of the vehicle body.

8. The center floor panel assembly according to claim 1, further including a reinforcement portion provided on outside of the tunnel portion and connecting a front sheet cross member to the tunnel portion with a predetermined space to reinforce stiffness.

9. The center floor panel assembly according to claim 1, wherein the center muffler unit includes:
   an inner pipe in which a flow path through which exhaust gas passes is formed,
   a heat insulating material surrounding the inner pipe to intercept heat transfer of the exhaust gas that flows through the flow path, and
   an outer pipe surrounding the heat insulating material and supported in the tunnel portion.

10. The center floor panel assembly according to claim 9, wherein plural holes are penetratingly formed on the inner pipe.

* * * * *